Patented Oct. 20, 1936

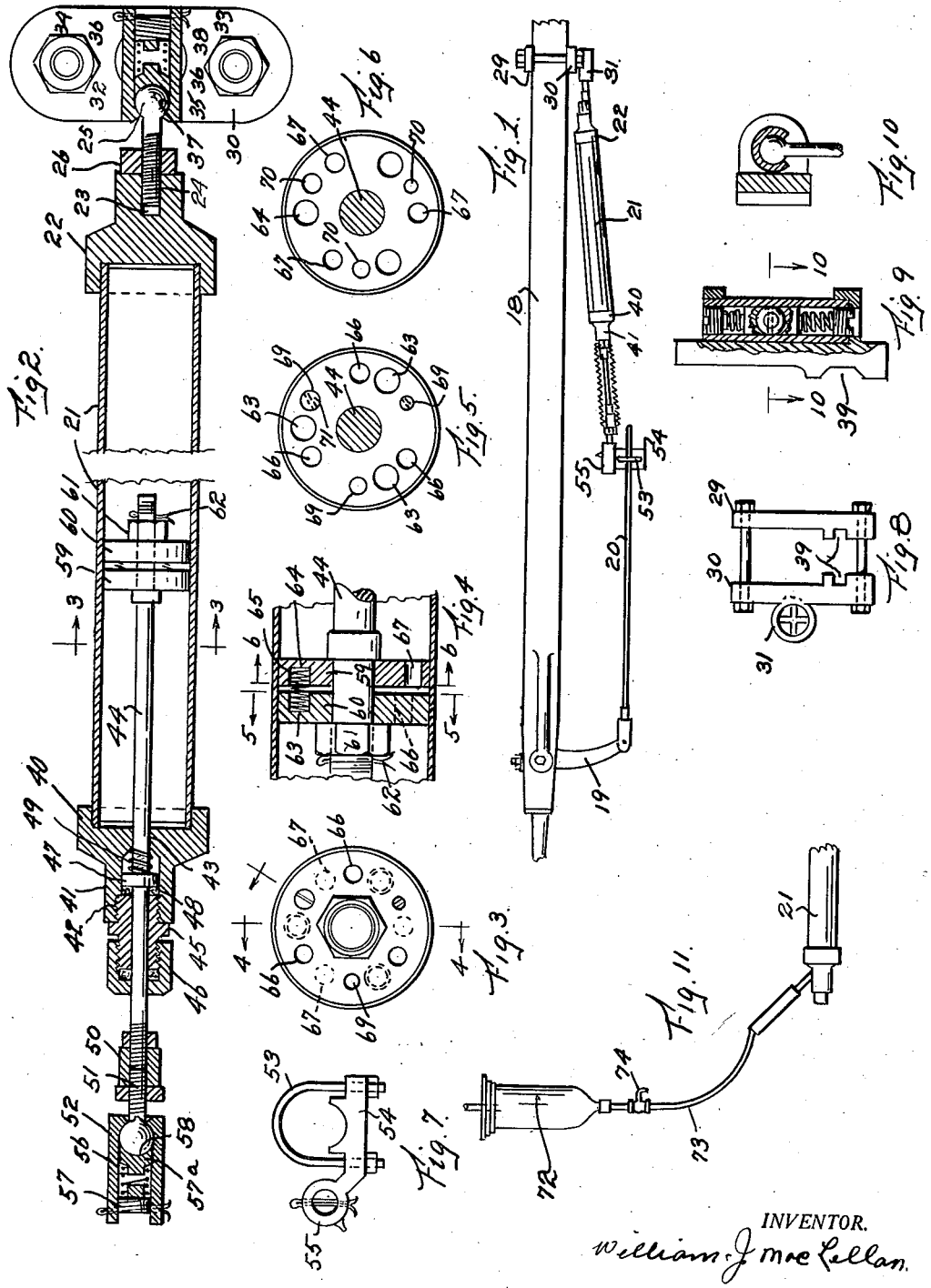

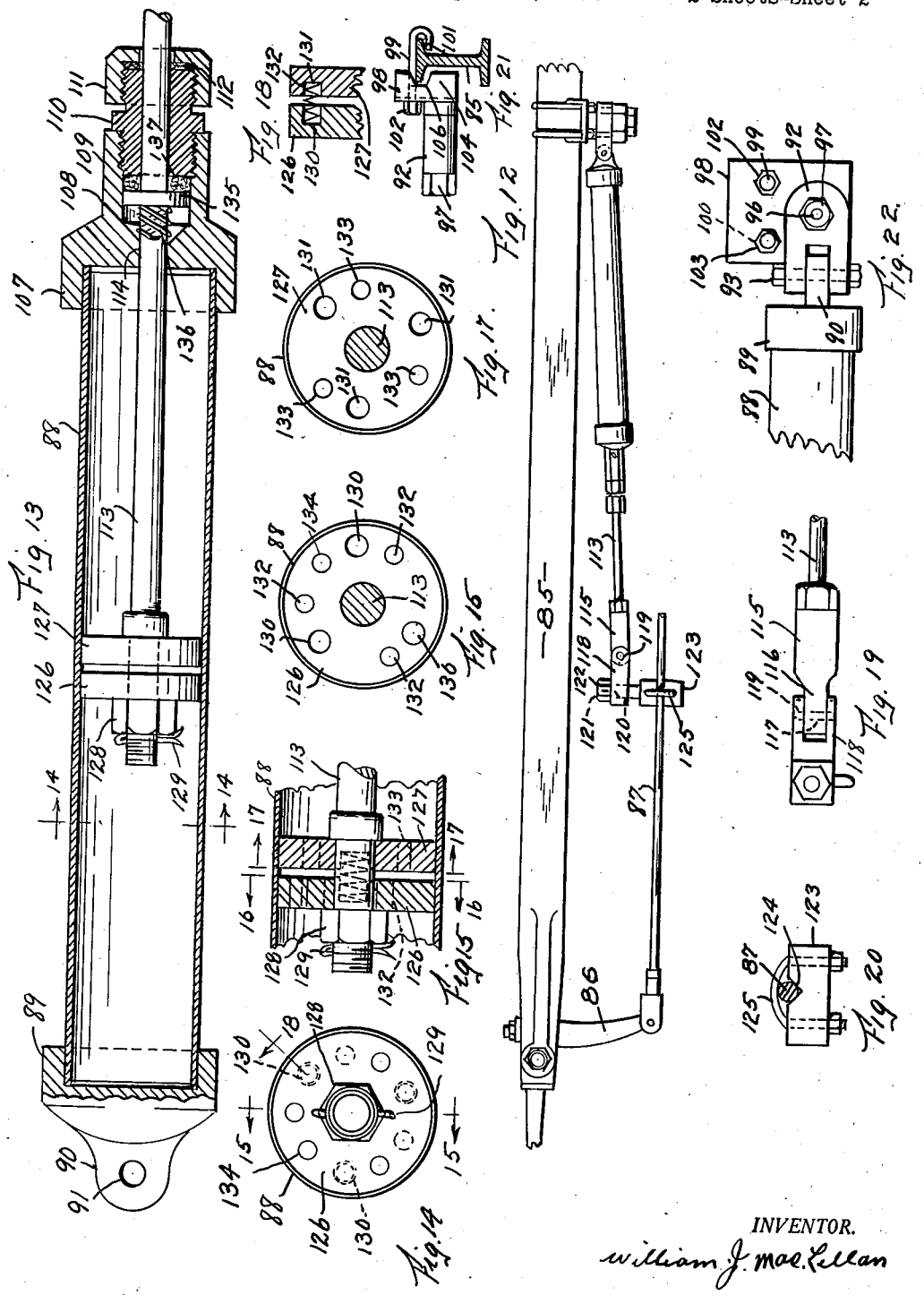

2,058,384

UNITED STATES PATENT OFFICE 2,058,384

HYDRAULIC STEERING STABILIZER

William J. MacLellan, Los Angeles, Calif., assignor, by mesne assignments, to I. A. Simon, Pittsburgh, Pa.

Application April 16, 1934, Serial No. 720,714

10 Claims. (Cl. 280—90)

My invention relates primarily to a stabilizer for the steering apparatus of motor vehicles, (although it is not limited to such specific use) and it has for its prime object the provision of means for application to the steering apparatus which will act to maintain the front wheels of the vehicle in their proper position to hold the vehicle in a steady course, and prevent the so-called "shimmy" or wabble of the front wheels.

A further object is to provide mechanism of the above character which can be easily and quickly applied to existing vehicles without the necessity for any material change or alteration in the vehicles, and which is equally applicable to new vehicles without any material structural alteration therein.

Another object is to provide mechanism of the above character so constructed and arranged that, while acting to maintain the front wheels of the vehicle in their proper relative position to cause the vehicle to travel in a straight path, the ordinary operation of the steering apparatus by the driver will be in no way interfered with.

A further object is to provide a device of the above character which will be simple and inexpensive in construction, simple and efficient in operation, and which does not require special knowledge or skill.

Another object is to provide mechanism of the above character which will, in the event of a tire being suddenly deflated such as by a "blow out" or being "thrown", etc., while the vehicle is in motion, act to hold the vehicle to its course, thus greatly reducing, if not entirely eliminating, the possibility of overturning or other untoward result and consequent injury to the passengers or damage to the vehicle.

A still further object is to provide means whereby too rapid or abrupt operation of the steering mechanism is prevented, thus materially lessening the danger of upsetting or capsizing the vehicle.

Other objects and advantages will appear hereinafter and, while I have shown and will describe the preferred form of my invention, I wish it to be understood that I do not limit myself to such preferred form, but that various changes and adaptations may be made therein without departing from the spirit of my invention.

In the drawings accompanying and forming a part hereof:

Fig. 1 is a top plan of so much of a vehicle front axle as is necessary to properly illustrate the application of my device thereto.

Fig. 2 is a central longitudinal section through my device, on an enlarged scale.

Fig. 3 is a transverse section on the line 3—3 of Fig. 2.

Fig. 4 is a section on the line 4—4 of Fig. 3.

Fig. 5 is a section on the line 5—5 of Fig. 4.

Fig. 6 is a section on the line 6—6 of Fig. 4.

Fig. 7 is an end elevation of the left hand end of Fig. 2.

Fig. 8 is a similar view of the right hand end of Fig. 2.

Fig. 9 is a central vertical section of a form of vertically sliding clamp.

Fig. 10 is a section on the line 10—10 of Fig. 9.

Fig. 11 is a diagrammatic view showing one form of automatic refilling means.

The preferred form of my device comprises a cylinder 21, one end of which is closed by a cap 22, which cap may be held positioned in any suitable or desired manner so as to provide a leak tight connection, but is preferably screw threaded and soldered after being assembled.

Projecting from the outer face of this cap in lengthwise alinement with cylinder 21 is a boss 22, which is preferably hexagonal in transverse elevation and is provided with a concentric, outwardly opening, interiorly screw threaded recess 23. Adjustably mounted in recess 23, in screw threaded engagement is one end of a rod 24, the other end of which terminates in a ball 25, a lock nut 26 being provided to lock the threaded end of rod 24 in its adjusted position within said recess.

Adjustably mounted upon opposite sides of the axle 18 by means of bolts 27 and 28 are bars 29 and 30 and projecting outwardly from bar 30, to extend transversely thereof, is a cylindrical member 31 provided with a concentric, longitudinally extending chamber 32 therethrough. One end of chamber 32 is screw threaded for the reception of an adjusting nut 33, a cotter pin 34 being provided to lock said nut in its adjusted position. The other end of chamber 32 is semi-globular in shape and forms a socket 35 for the reception of ball 25. Slidably mounted within chamber 32 between ball 25 and nut 33 is a plug 36 in one face of which is formed a semi-globular recess 37 for engagement with ball 25, and positioned between the opposite face of this plug 36 and the inner face of nut 33 is a coil spring 38 which acts to normally hold said plug in engagement with ball 25.

Bars 29 and 30 are each provided near their lower ends with an opposed recess 39 which straddle the lower flange of axle 18, the purpose of which will be obvious.

Secured in any suitable manner, preferably by screw threading and soldering, upon the other end of cylinder 21 is a cap 40 provided upon its outer face with a reduced concentric extension 41 in the outer free end of which is provided a concentric recess 42 and extending from the bottom wall of this recess to the inner face of the cap 40 is a passage 43 arranged for the reception of the piston rod 44. The outer end of recess 42 is screw threaded for operative engagement with one end of a packing gland 45. The other end of gland 45 is exteriorly screw threaded and upon this threaded end is mounted a removable cap nut 46. Slidably mounted within recess 42, to surround rod 44, is a collar 47 and between this collar 47 and gland 45 is positioned suitable packing material 48. A coil spring 49 is mounted in the bottom or innermost end of recess 42 to surround rod 44 and acts to constantly force collar 47 outwardly and thus compress packing 48 against the end of gland 45 to maintain a fluid tight joint around rod 44.

The outer end of rod 44 is detachably connected by a threaded coupling 50 to one end of a rod 51 the other end of which rod, 51, terminates in a ball 52. Rigidly, but detachably, mounted upon the tie rod 20, by means of a U-bolt 53, is a bracket 54 which carries an integral cylindrical boss 55. Provided through this boss 55 is a passage 56 one end of which is screw threaded for operative engagement with an adjusting nut 57. The other end of passage 56 is formed semi-globular in shape for the reception of ball 52.

Slidably mounted within the passage 56 adjacent to ball 52 is a plug 57ª one face of which is formed into a semi-globular recess 58 for cooperation with the semi-globular end of passage 56 to form a socket for ball 52.

Positioned upon the end of rod 44, within cylinder 21 is my piston or check valve. This piston is composed of two similar companion discs 59 and 60, loosely mounted upon the reduced end of rod 44 and normally held positioned by nut 61 and cotter 62. Each of these discs is of a diameter to snugly but slidably fit the interior of cylinder 21 and have formed in their opposed faces opposed sockets 63 and 64 and in these sockets are positioned the coil springs 65 which normally act to maintain said discs slightly spaced apart but to permit of their abutting together as hereafter explained.

Extending through discs 59 and 60 are ports 66 and 67, of which I have shown three but a greater or less number may be provided if found necessary or desirable. It will be noted that ports 66 and 67 are offset or staggered circumferentially relative to each other so that when discs 59 and 60 are spaced apart, as during the ordinary operation of the steering mechanism, fluid can flow from one side to the other of the piston freely through said ports so as to avoid any undue drag on the steering wheel, while upon any sudden shock or impact being imparted to the wheels said discs are forced together against the action of springs 65 and the ports closed, each disc acting to close the ports in the opposite disc. Provided through discs 59 and 60 are bypass openings 69 and 70 which are in register and are adapted to bypass the fluid from one side of the piston to the other, after the discs have been forced together, and permit the piston to move to equalize the pressure. Openings 69 in disc 59 are of different diameters or areas and are screw threaded for cooperation with screw plugs 71 whereby any of said openings may be closed and rendered ineffective. This variable opening construction is arranged to permit adjustment of the device to suit varying types and weights of vehicles, by permitting variation of the bypass area. Cylinder 21 will, of course, be filled with a suitable hydraulic fluid such as oil or the like when in use and if found necessary or desirable a tank 72 may be suitably positioned upon the instrument panel or other suitable place in the vehicle (not shown) and this tank connected by a suitable conduit 73, preferably flexible tubing, to the end cap of cylinder 21, a control valve or shut off 74 being provided. A suitable check valve of any desired type will be provided for the inlet into the cylinder and so arranged as to permit fluid to flow from tank 72 into cylinder 21 to replace any leakage.

In the operation of my device:—

During the ordinary operation of the steering mechanism by the driver the movement of the piston lengthwise of the cylinder will be sufficiently slow to avoid compression of the springs so that the discs will remain spaced apart and the fluid will have free passage through the piston.

In the event of any sudden shock being imparted to the steering mechanism or the wheels, such as the wheels striking a depression or an obstruction, or a tire blows out or is thrown off, the piston is caused to move suddenly compressing the springs and forcing the discs together and closing all the openings therethrough except the particular bypass from which the screw plug has been removed, and retarding further movement of the piston to a speed corresponding to the area of the bypass and the pressure generated by the shock. Immediately the shock or impact ceases the springs act to force the discs apart, opening all of the ports permitting free passage of fluid through the piston insuring immediate equalization and return of the piston to its normal position.

In Figures 12 to 22 inclusive, I have shown a modified form of my device.

Fig. 12 is a top plan of so much of a vehicle axle as is necessary to properly illustrate the application of this modified form thereto.

Fig. 13 is an enlarged central longitudinal section through a portion of Fig. 12.

Fig. 14 is a transverse section on the line 14—14 of Fig. 13.

Fig. 15 is a section on the line 15—15 of Fig. 14.

Fig. 16 is a section on the line 16—16 of Fig. 15.

Fig. 17 is a section on the line 17—17 of Fig. 15.

Fig. 18 is a fragmentary section taken on the line 18—18 of Fig. 14.

Figs. 19 and 20 are a side and end elevation, respectively, of the means for connecting one end of this form to the tie rod.

Figs. 21 and 22 are a side and end elevation, respectively, of the means for connecting the other end of my device to the vehicle.

85 indicates a conventional vehicle front axle, the steering knuckles, 86, of which are connected by the usual tie rod 87.

This form comprises the cylinder 88, one end of which is closed by a cap 89, held positioned in any suitable manner such as screw threads and the like and soldered after being assembled, and, projecting from the outer face of this cap in longitudinal alinement with cylinder 88, is an ear or lug 90 through the outer end of which is provided an aperture 91. Straddling the lug 91 is a bifurcated clip 92, held positioned by the pivot bolt 93, to swing horizontally. Provided through the outer end of this clip 92 at a right angle to the bolt 93, is an aperture 96, arranged for the rotative reception of the stud 97, which stud projects outwardly from the outer face of the securing bracket 98, a nut being provided to detachably secure the same positioned for use.

Extending through the bracket 98, immediately adjacent to the top face of the axle 85 are bolts 99 and 100, the outer ends of which are bent to hook over the rear edge of the top flange 101, and the other ends of which are threaded and provided with nuts 102 and 103, providing means for securely fastening bracket 98 upon the axle 85. Extending at right angles from the ends of the inner face of bracket 98 are wings 104 and 105 in which are provided substantially V-shaped notches 106 arranged to straddle the edge of the top flange 101 of the axle 85.

Secured in any suitable manner upon the other end of cylinder 88 is a cap 107, provided on its outer face with a concentric reduced extension 108 in the outer end of which is formed a socket or recess 109. The outer end of socket 109 is interiorly screw threaded for operative engagement with a packing gland 110, and screw threadedly mounted upon the outer end of this gland is a cap nut 111, suitable packing 112 being provided to insure a leak proof connection therebetween.

Mounted within the cylinder 88, normally positioned about centrally of the length thereof, is a piston or check valve supported upon the inner end of a stem 113. The other end of stem 113 extends through an aperture 114 in the bottom wall of socket 109 through gland 110 and nut 111, and has adjustably mounted upon its outer end one end of a link 115, the other end 116, of which is flattened and provided with an aperture 117 therethrough. Straddling the link 115, at the flattened end 116 and in pivotal engagement therewith, is the bifurcated end of a clevis 118, held positioned by a bolt 119. Provided through the other end of clevis 118, at a right angle to bolt 119 is a hole 120 adapted for the reception of a bolt 121, a nut 122 being provided to normally hold the same positioned pivotally upon said stud.

Stud 121 projects outwardly from one end of a securing bracket 123. Formed in the upper face of bracket 123, about centrally of the length thereof, is an upwardly opening V-shaped groove 124 adapted for the reception of the tie rod 87, a U-bolt 125 being provided to rigidly secure said bracket and rod together against relative movement while at the same time permitting manual adjustment when desired or necessary.

This form of my piston or check valve is composed of two similar companion members or discs 126 and 127, loosely mounted upon the reduced inner end of stem 113, and normally held positioned by a nut 128 and cotter 129. Each of these discs is of a diameter to snugly but slidably fit the interior of the cylinder 88 and are provided in their inner faces with opposed sockets 130 and 131, and in these sockets are positioned the ends of coil springs 132, which normally act to hold said discs slightly spaced apart but to permit of their abutting together when necessary.

Extending through discs 126 and 127 are passages 132 and 133, of which I have shown three, although more or less may be used as found necessary or desirable. The passages 132 and 133 are offset or staggered radially relative to each other so that when the discs are abutting together the openings therethrough are closed, the object of this construction being to permit fluid to pass from one side to the other of the piston during the ordinary operation of the steering mechanism freely enough to avoid any undue drag thereof and at the same time to provide means for materially reducing the volume capacity of the fluid passage past the piston upon any sudden impact or impulse being imparted to the wheels or steering mechanism, as the coil springs will yield upon any sudden impulse and permit the discs to move together and thus close the openings excepting the one in register with the bypass opening 134 in disc 126. Slidably mounted upon the stem 113, within the socket 109 and at the lower end thereof is a collar 135, and coiled around said stem between said collar and the bottom wall of said recess is a coil spring 136. Positioned within recess 109 between gland 110 and collar 135 is a packing 137 providing means for preventing leakage around stem 113 through gland 110, collar 135 and spring 136 acting to compress said packing to compensate for wear.

The operation of this form of my device will be substantially similar to the preferred form.

Having described my invention, what I claim is:

1. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston consisting of normally spaced discs movable on the piston rod and having a plurality of apertures for the passage of fluid, an aperture of one disc being offset with respect to an aperture of the other disc, so that when a sudden fluid pressure is exerted on either side of the piston, one disc is moved to a position immediately adjacent the other and the apertures are substantially closed to the passage of fluid.

2. A stabilizer for the steering mechanism of a vehicle comprising a hydraulic cylinder and piston, said stabilizer having means for connecting the stabilizer for universal movement at one end to a part of the vehicle stationary with respect to the steering mechanism and at the other end to the steering mechanism, said piston consisting of normally spaced discs movable on the piston rod and having a plurality of apertures for the passage of fluid, an aperture of one disc being offset with respect to an aperture of the other disc, so that when a sudden fluid pressure is exerted on either side of the piston, one disc is moved to a position immediately adjacent the other and said apertures are substantially closed to the passage of fluid.

3. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston consisting of normally spaced discs movable on the piston rod and having a plurality of apertures for the passage of fluid, some of the apertures in one disc being offset with respect to some of the apertures in the adjacent disc and at least one of the apertures in each disc being in alignment, whereby when sudden pressure is exerted on either side of the piston, one of said discs is moved to a position immediately adjacent the other and said offset apertures are substantially closed to the passage of fluid, and said aligned apertures are brought substantially into register.

4. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston consisting of normally spaced discs movable on the piston rod and having a plurality of apertures for the passage of fluid, resilient means for spacing said discs, an aperture of one disc being circumferentially offset with respect to an aperture of the other disc, so that when sudden pressure is exerted on either side of the piston, one disc is moved to a position immediately adjacent the other and said apertures are substantially closed to the passage of fluid.

5. A stabilizer comprising a piston and a casing within which said piston moves, said piston consisting of normally spaced plates movable on the piston rod and having a plurality of apertures for the passage of fluid, an aperture of one plate being offset with respect to an aperture of the other plate, so that when sudden pressure is exerted on either side of the piston, one plate is moved to a position immediately adjacent the other and said apertures are substantially closed to the passage of fluid.

6. A stabilizer for the steering mechanism of a vehicle comprising a hydraulic cylinder and piston, said stabilizer having means for connecting the stabilizer for movement about axes at substantially right angles to each other, at one end to a part of the vehicle stationary with respect to the steering mechanism and at the other end to the steering mechanism, said piston consisting of normally spaced discs movably mounted on the piston rod and having a plurality of apertures for the passage of fluid, an aperture of one disc being offset with respect to an aperture of the other disc, so that when a sudden fluid pressure is exerted on either side of the piston, one disc is moved to a position immediately adjacent the other and said apertures are substantially closed to the passage of fluid.

7. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston consisting of a pair of spaced discs movably mounted on the piston rod and of a diameter to snugly but slidably engage the cylinder, said discs having apertures for the passage of fluid and an aperture in one disc being offset with respect to an aperture on the other disc, so that when a sudden fluid pressure is exerted on one disc, it is moved into contact with the other disc and passage of fluid through said apertures is substantially closed.

8. A stabilizer for the steering mechanism of a vehicle comprising a hydraulic cylinder and piston, said cylinder connected to a part of the vehicle stationary with respect to the steering mechanism and said piston connected to the steering mechanism, said piston consisting of normally spaced discs movable on the piston rod and having a plurality of apertures for the passage of fluid, an aperture of one disc being offset with respect to an aperture of the other disc, so that when a sudden fluid pressure is exerted on either side of the piston, one disc is moved to a position immediately adjacent the other and the apertures are substantially closed to the passage of fluid.

9. A stabilizer for the steering mechanism of a vehicle comprising a hydraulic cylinder and piston, said cylinder connected to a part of the vehicle stationary with respect to the steering mechanism and said piston connected to the steering mechanism, said piston consisting of normally spaced discs movable on the piston rod and having a plurality of apertures for the passage of fluid, some of the apertures of one disc being offset with respect to some of the apertures in the adjacent disc and at least one of the apertures in each disc being in alignment, whereby when a sudden fluid pressure is exerted on either side of the piston, one of said discs is moved to a position immediately adjacent the other and said offset apertures are substantially closed to the passage of fluid and said aligned apertures are brought substantially into register.

10. A stabilizer for the steering mechanism of a vehicle comprising a hydraulic cylinder and piston, said stabilizer adapted for connection at one end to a part of the vehicle stationary with respect to the steering mechanism and at the other end to the steering mechanism, said piston consisting of normally spaced discs at least one of which is movable on the piston rod and the discs having a plurality of apertures for the passage of fluid, an aperture of one disc being offset with respect to an aperture of an adjacent disc, so that when a sudden fluid pressure is exerted on one side of the piston, one said movable disc is moved to a position immediately adjacent another disc and the apertures are substantially closed to the passage of fluid.

WILLIAM J. MacLELLAN.